United States Patent
Wakeman

[11] Patent Number: 5,247,918
[45] Date of Patent: Sep. 28, 1993

[54] SEALING A DIRECT INJECTION FUEL INJECTOR TO A COMBUSTION CHAMBER

[75] Inventor: Russell J. Wakeman, Newport News, Va.

[73] Assignee: Siemens Automotive L.P., Auburn Hills, Mich.

[21] Appl. No.: 946,997

[22] Filed: Sep. 17, 1992

[51] Int. Cl.⁵ .................................... F02M 61/14
[52] U.S. Cl. ........................... 123/470; 277/236
[58] Field of Search ............... 123/470; 277/235 A, 277/236; 239/DIG. 4

[56] References Cited

U.S. PATENT DOCUMENTS

| | | | |
|---|---|---|---|
| 3,595,588 | 7/1971 | Rode | 277/236 |
| 3,841,277 | 10/1974 | Schafer | 123/470 |
| 4,067,585 | 1/1978 | Rode | 277/236 |
| 4,506,645 | 3/1985 | Hewlitt et al. | 123/470 |
| 4,519,371 | 5/1985 | Nagase et al. | 123/470 |
| 4,528,959 | 7/1985 | Hauser, Jr. | 123/470 |
| 4,602,888 | 7/1986 | Court et al. | 277/236 |
| 4,647,012 | 3/1987 | Gartner | 123/470 |
| 4,877,272 | 10/1989 | Chevallier et al. | 277/236 |
| 4,946,174 | 8/1990 | Usui | 277/236 |
| 5,044,340 | 9/1991 | Robnett | 123/470 |
| 5,066,029 | 11/1991 | Gill | 277/236 |
| 5,074,269 | 12/1991 | Herbon et al. | 123/470 |
| 5,080,070 | 1/1992 | Hafner | 123/470 |
| 5,125,383 | 6/1992 | Meier et al. | 123/470 |

Primary Examiner—Willis R. Wolfe
Assistant Examiner—Thomas Moulis
Attorney, Agent, or Firm—George L. Boller; Russel C. Wells

[57] ABSTRACT

A combustion seal for sealing the nozzle end of a direct injection fuel injector to the combustion chamber. The seal is an imperforate metal ring, much like an eyelet, fitted onto the nozzle end. In radial cross section the ring has a semi-circular shape that is compressed between respective shoulders on the nozzle end and a through-hole in a cylinder head in which the fuel injector is mounted. The ring is a ferrous metal that is plated with a softer metal, such as zinc.

5 Claims, 1 Drawing Sheet

SEALING A DIRECT INJECTION FUEL INJECTOR TO A COMBUSTION CHAMBER

FIELD OF THE INVENTION

This invention relates to internal combustion engines, particularly those that are equipped with direct injection type fuel injectors.

BACKGROUND AND SUMMARY OF THE INVENTION

A direct injection fuel injector has a nozzle end that typically is disposed in and sealed to a through-hole in an engine cylinder head leading to an engine combustion chamber. Fuel is injected into the space of the combustion chamber where it mixes with air to form a mixture that is combusted to power the engine. The severe nature of this environment imposes demanding requirements on the sealing of the injector nozzle end to the through-hole. A commercially acceptable seal must have a useful life at least equal to that of the engine, while tolerating direct exposure to the pressure, temperature, and chemistry of the combustion process. Moreover, in the vicinity of the fuel injector's nozzle end, the seal may be the sole contact between the large thermal mass of the engine and the body of the fuel injector, and hence the sole path for conductive heat transfer from the nozzle end of the fuel injector body.

A known seal that has been used for such application is a flat metal crush washer, typically aluminum or copper. While such a seal is relatively inexpensive and possesses good thermal conductivity and sufficient softness to be crushed into an effective thermally conductive sealing device for this application, its crush characteristic can at times work a disadvantage. Why this is so will now be explained.

The seal may be considered like a spring element that, upon being compressed axially urges itself against respective shoulders on the fuel injector and the cylinder head as it is being crushed to sealing contact with the two. This crushing occurs in response to the application of what typically must be a relatively large installation force for retaining the fuel injector body on the cylinder head.

Because of space constraints proximate the cylinder head, the force may have to be delivered to an end of the fuel injector body that is opposite its nozzle end, and consequently the fuel injector body may be stressed in unpredictable ways that affect its internal parts. For example, precision alignments and clearances may change in unpredictable ways leading to potentially adverse effects on performance, especially if the magnitude of the stress-induced force approximates that of the assembly force which holds the various parts of the fuel injector together. In an engine that has multiple combustion chambers and fuel injectors, the development of random retention forces may also create unacceptable injector-to-injector variations. The problem is compounded when the materials of the fuel injector body and the cylinder head have different coefficients of thermal expansion, such as in the case of an aluminum cylinder head and an injector body of ferrous material.

Alternative forms of seals that do not rely on the development of large axial forces to effectuate the sealing action, i.e. radial seals such as o-rings, V-seals, lip seals, etc., are beset by certain disadvantages that may involve one or more of the following: higher cost, poorer thermal conductivity, poorer tolerances, and more difficult installation.

The present invention retains the use of axial force to develop the required sealing action, but does so without accompanying disadvantages such as those mentioned above. Briefly, the seal that is employed in accordance with the principles of the invention may be considered an eyelet-shaped part that can be squeezed axially to fit into the same annular space, or cavity, as a radial seal. The axial tolerance of the cavity and the characteristics of the eyelet-shaped part can be controlled so that over the expected tolerance range and the expected thermal expansion, proper sealing will be obtained. The eyelet-shaped part has a relatively low spring rate in comparison to a crush washer so that acceptable sealing is attained with the application of relatively low axial retention force on the injector. This avoids unduly stressing the fuel injector body and disrupting the precision relationships that are internal to it. The eyelet-shaped part is a resilient metal ring that is preferably plated with a thin coating of a relatively softer metal, such as zinc, tin, or cadmium, so that abutting part surfaces do not have to have perfect surface finish. The cost of making the eyelet-shaped part is economical because it can be fabricated from a metal like steel by metal forming techniques such as stamping. Because the eyelet-shaped part is thermally conductive metal, it provides a heat conduction path from the nozzle end of the fuel injector body to the engine cylinder head.

The foregoing features, advantages, and benefits of the invention, along with additional ones, will be seen in the ensuing description and claims which should be considered in conjunction with the accompanying drawings. The drawings illustrate a presently preferred embodiment of the invention according to the best mode contemplated at this time for carrying out the invention.

DESCRIPTION OF THE PREFERRED EMBODIMENT

Figure 1:
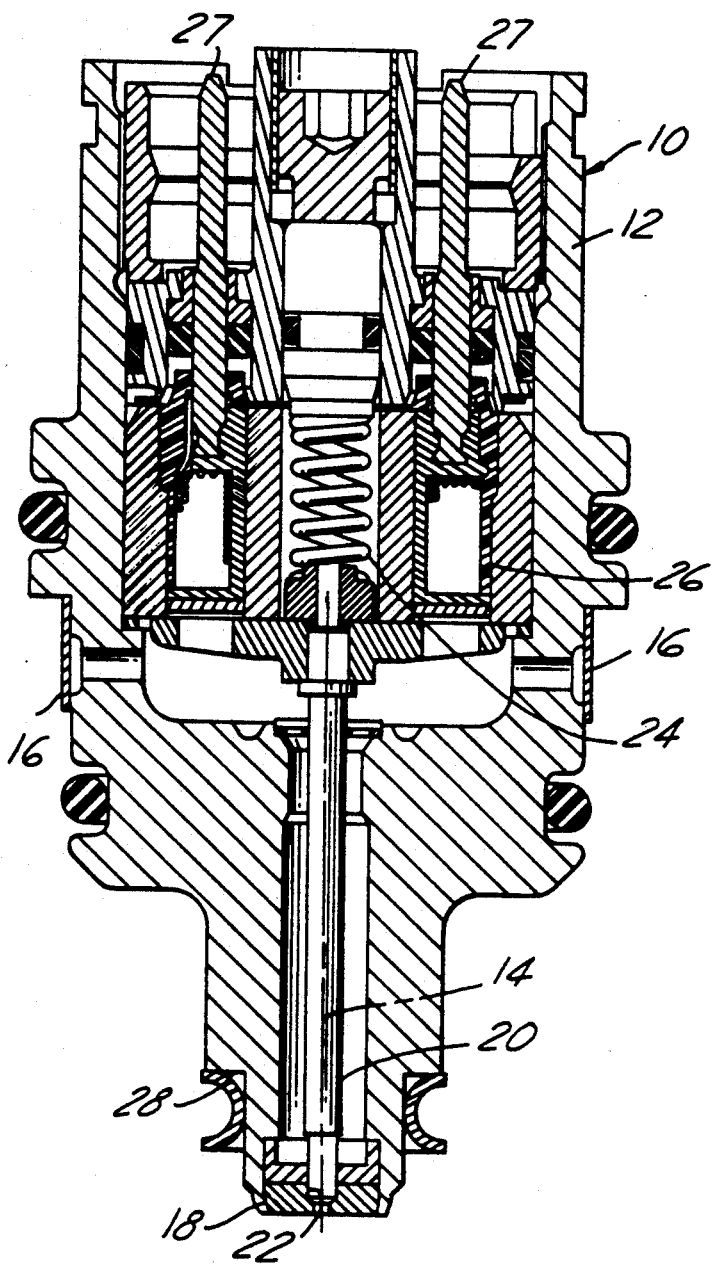
FIG. 1 is a longitudinal view partly in cross section of a fuel injector embodying a combustion seal according to the invention.

FIG. 1 shows a direct injection type fuel injector 10 comprising a generally cylindrical-shaped body 12 having a central longitudinal axis 14. Fuel injector 10 has a fuel inlet 16 in the side wall of body 12 and a nozzle 18 at the lower longitudinal end. Internally, the fuel injector comprises a needle 20 that is selectively operated to seat on and unseat from a valve seat 22 for controlling the flow of fuel from inlet 16 to nozzle 18. The operating mechanism for needle 20 includes a spring 24 that biases needle 20 toward closure on valve seat 22 for blocking fuel flow and a solenoid 26 that, when energized via electric current flowing through a pair of externally accessible terminals 27, acts to unseat the needle from the seat for allowing fuel to be delivered via nozzle 18. The nozzle end of body 12 has a circular cylindrical shape and comprises a shoulder 28 that faces toward the engine combustion chamber when the fuel injector is installed on an engine.

Figure 2:
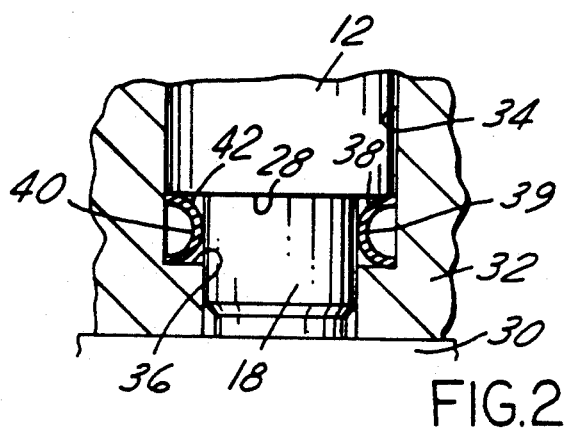
FIG. 2 is a fragmentary longitudinal view of the nozzle end of the fuel injector, including the seal, disposed in a cross-sectioned through-hole in an engine cylinder head leading to a combustion chamber.

FIG. 2 shows an example of such an engine installation. The combustion chamber space, which in a reciprocal piston type engine, is cylindrical in shape, is designated by the numeral 30, and is bounded at the top by a cylinder head 32. The fuel injector is mounted on the engine with its nozzle end disposed in a through-hole 34 in cylinder head 32. Fuel is supplied to fuel injector 10 through an internal passageway in the cylinder head and is injected from the nozzle into combustion chamber space. Through-hole 34 has a shoulder 36 that faces shoulder 28. A combustion seal 38 according to the present invention is disposed in the annular space 39 that is bounded axially by shoulders 28 and 36, and circumferentially by body 12 and through-hole 34.

Figure 5:
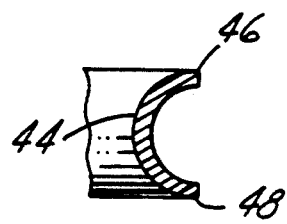
FIG. 5 is an enlarged radial cross section taken in the direction of arrows 5—5 in FIG. 4.
Figure 4:
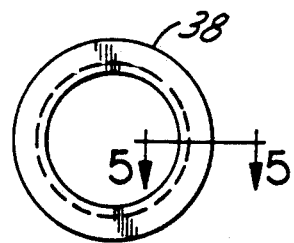
FIG. 4 is an end view of the seal, looking in the direction of arrows 4—4 in FIG. 3.
Figure 3:
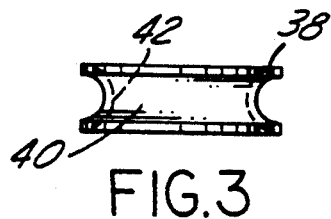
FIG. 3 is a longitudinal view of the seal by itself.

FIGS. 3-5 disclose further detail of combustion seal 38. It is an imperforate metal ring that in radial cross section appears as a generally semi-circularly curved strip having generally semi-circularly curved concave and convex surfaces 40 and 42 respectively on opposite faces. As seen in FIG. 5, the bulk of the generally semi-circularly curved cross section is a true semi-circle 44 and the termini of the generally semi-circular cross section are short parallel segments 46, 48 extending tangentially from opposite ends of the true semi-circle 44. When the fuel injector is installed in through-hole 34, shoulders 28 and 36 bear from opposite directions against surface 42 at segments 46, 48, slightly deforming the radial cross section of the seal. Ample bearing area is provided by including segments 46, 48. As a result, sealing action is provided by surface 42 resiliently bearing against shoulders 28 and 36. Seal 38 is disposed such that surface 42 faces radially inwardly and surface 40 faces radially outwardly. Further reaction of the seal with body 12 may be provided by sizing the I.D. of the seal to the surrounded O.D. of body 12 whereby the portion of surface 42 that is at the midpoint of semi-circle 44 bears against body 12. Advantageously, seal 38 is a metal that is plated with a thin coating of a softer metal.

Ordinary manufacturing procedures enable the dimensions of annular space 39 and seal 38 to be controlled to tolerances that in turn will provide proper sealing forces to be developed when the injector is installed on the engine. The installation force necessary to develop these sealing forces is much less than in the case of the crush seal mentioned earlier, and hence installation stress levels in the fuel injector will also be much lower so that disruption of internal relationships within the fuel injector will be negligible and therefore not impair fuel injector performance when installed on the engine.

While a presently preferred embodiment of the invention has been illustrated and described, it should be appreciated that principles are applicable to other embodiments.

What is claimed is:

1. An internal combustion engine comprising a combustion chamber space in which a combustible fuel-air mixture is combusted to power the engine, a through-hole in the engine to said combustion chamber space, and a fuel injector having a nozzle end mounted in said through-hole for injecting fuel into said combustion chamber space, and sealing means for sealing said nozzle end to said through-hole characterized by the improvement which comprises said nozzle end having a shoulder facing said combustion chamber space, said through-hole having a shoulder facing said nozzle end's shoulder, and a sealing ring disposed between said shoulders, said sealing ring comprising an imperforate body that in radial cross section appears as a generally semi-circularly curved strip having generally semi-circularly curved concave and convex surfaces on opposite faces, said generally semi-circularly curved convex surface bearing against said shoulders.

2. An internal combustion engine as set forth in claim 1 in which said sealing ring is disposed such that said generally semi-circularly curved convex surface faces radially inwardly and said generally semi-circularly curved concave surface faces radially outwardly.

3. An internal combustion engine as set forth in claim 2 in which a portion of said generally semi-circularly curved convex surface that is spaced from the bearings thereof against said shoulders bears against said nozzle end.

4. An internal combustion engine as set forth in claim 1 in which said sealing ring is metal.

5. An internal combustion engine as set forth in claim 1 in which said sealing ring is plated with a thin coating of a metal that is softer than that of the ring itself.

* * * * *